US012264767B2

(12) United States Patent
Zann et al.

(10) Patent No.: US 12,264,767 B2
(45) Date of Patent: *Apr. 1, 2025

(54) POLYETHYLENE PIPE SERVICE SYSTEM INCLUDING QUICK CONNECT MEANS FOR POLYETHYLENE PIPE TAPPING, PLUGGING, AND COMPLETION OPERATIONS

(71) Applicant: TDW Delaware, Inc., Wilmington, DE (US)

(72) Inventors: Olivier Zann, Bischheim (FR); Robin Cailloux, Bischheim (FR); Nicolas Horst, Bischheim (FR); Stephane Burgert, Bischheim (FR)

(73) Assignee: TDW Delaware, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,546

(22) Filed: Oct. 23, 2023

(65) Prior Publication Data

US 2024/0159341 A1 May 16, 2024

Related U.S. Application Data

(63) Continuation of application No. 17/240,465, filed on Apr. 26, 2021, now Pat. No. 11,796,106, which is a (Continued)

(51) Int. Cl.
*F16L 47/34* (2006.01)
*F16K 1/30* (2006.01)
(Continued)

(52) U.S. Cl.
CPC ............ *F16L 37/256* (2013.01); *F16K 1/308* (2013.01); *F16L 47/34* (2013.01); *F16L 55/07* (2013.01);
(Continued)

(58) Field of Classification Search
CPC ....... Y10T 137/612–6147; F16K 1/308; F16L 37/256; F16L 41/06; F16L 47/34; F16L 55/07; F16L 55/1108
See application file for complete search history.

(56) References Cited

U.S. PATENT DOCUMENTS

| 346,438 A | 7/1886 | Gillette et al. |
| 1,230,134 A | 6/1917 | Yarman |
| (Continued) | | |

FOREIGN PATENT DOCUMENTS

| DE | 4420179 A1 | 12/1995 |
| EP | 2372216 B1 | 7/2013 |
| (Continued) | | |

*Primary Examiner* — Matthew W Jellett
(74) *Attorney, Agent, or Firm* — GableGotwals

(57) ABSTRACT

Embodiments of a polyethylene ("PE") pipe servicing system of this disclosure may include a fusible PE fitting (F) providing a branch connection to a PE pipeline section or run (P), a valve (10) connected to the fitting and including quick connect/disconnect means, and a machine connectable to the valve including complementary quick connect/disconnect means. The quick connect means provide for full scope of operation, including cleaning, fusion, cool down, hot tap, plugging, and completion. No squeezing is used. The quick connect/disconnect means may include a first portion 20 of a cam profile and a second portion 40 of the cam profile complementary to that of the first. The machine may be a drilling or hot tapping machine (30T), a plugging machine (30P), or a completion machine (30C), and their associated tools. The valve and machine are more lightweight and faster and easier to use than the prior art.

20 Claims, 10 Drawing Sheets

Related U.S. Application Data continuation of application No. 16/812,985, filed on Mar. 9, 2020, now Pat. No. 10,989,344.

(60) Provisional application No. 62/892,351, filed on Aug. 27, 2019, provisional application No. 62/815,207, filed on Mar. 7, 2019.

(51) Int. Cl.
  *F16L 37/256* (2006.01)
  *F16L 55/07* (2006.01)
  *F16L 55/11* (2006.01)

(52) U.S. Cl.
  CPC ........ *F16L 55/1108* (2013.01); *Y10T 137/613* (2015.04); *Y10T 137/6137* (2015.04)

(56) References Cited

U.S. PATENT DOCUMENTS

| | | | |
|---|---|---|---|
| 2,790,571 A | 4/1957 | Flaith et al. | |
| 3,753,442 A | 8/1973 | Tauber | |
| 3,756,267 A * | 9/1973 | Hutton | F16L 47/34 408/105 |
| 3,773,067 A * | 11/1973 | Ray | F16L 41/06 137/318 |
| 4,181,143 A | 1/1980 | Fallon | |
| 4,411,287 A | 10/1983 | Hyde | |
| 4,736,926 A | 4/1988 | Fallon et al. | |
| 5,052,431 A | 10/1991 | Jiles | |
| 5,172,942 A | 12/1992 | Dillmann | |
| 5,778,919 A | 7/1998 | Petrone | |
| 6,640,827 B1 | 11/2003 | McClure | |
| 8,001,988 B2 | 8/2011 | Wilson et al. | |
| 8,899,254 B1 | 12/2014 | Weiler | |
| 9,115,841 B2 | 8/2015 | Bourne | |
| 9,599,268 B2 | 3/2017 | King et al. | |

FOREIGN PATENT DOCUMENTS

| | | |
|---|---|---|
| JP | H08113963 A | 5/1996 |
| KR | 100748173 B1 | 8/2007 |
| WO | 9014536 A1 | 11/1990 |
| WO | 201800541 A1 | 1/2018 |

\* cited by examiner

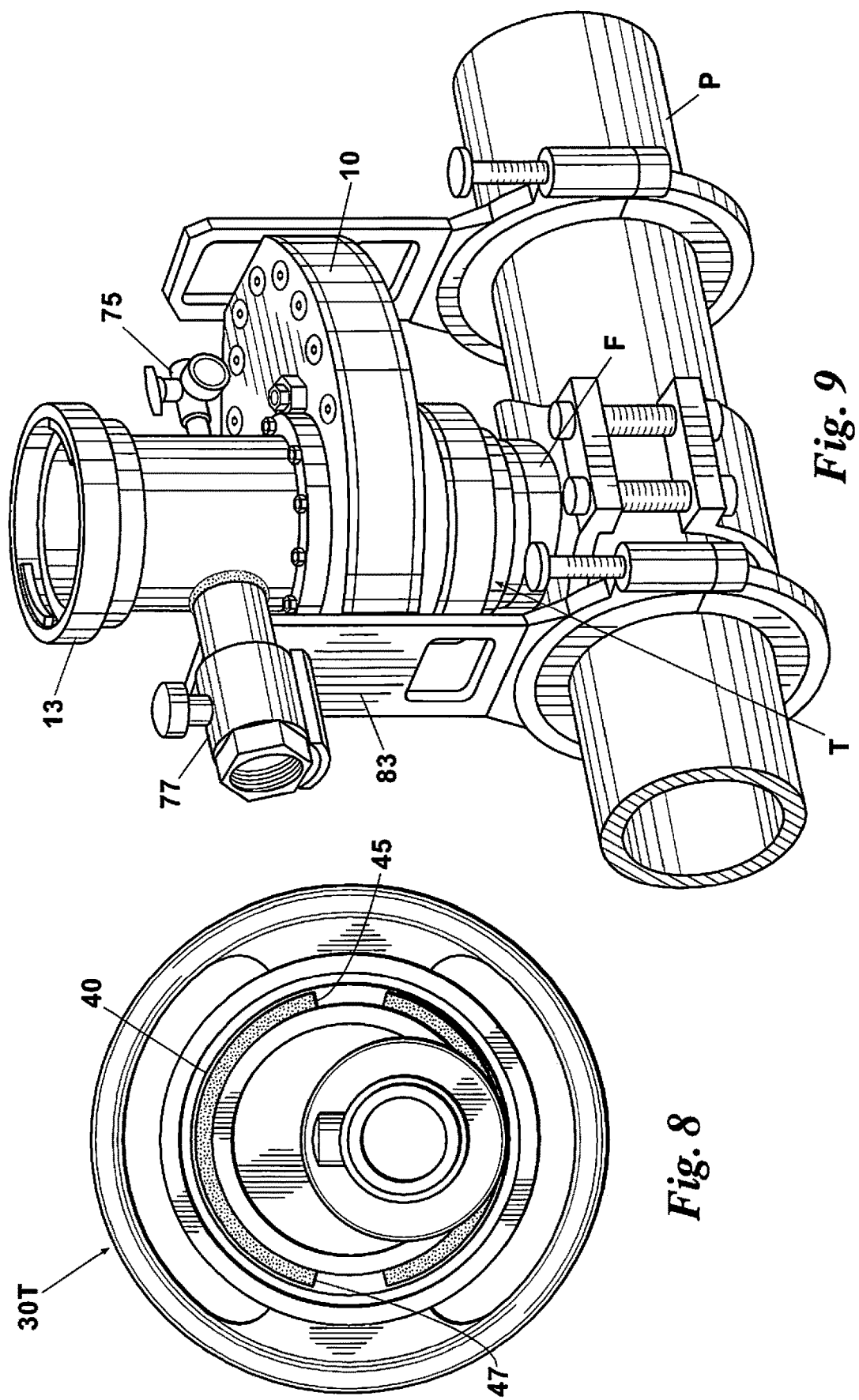

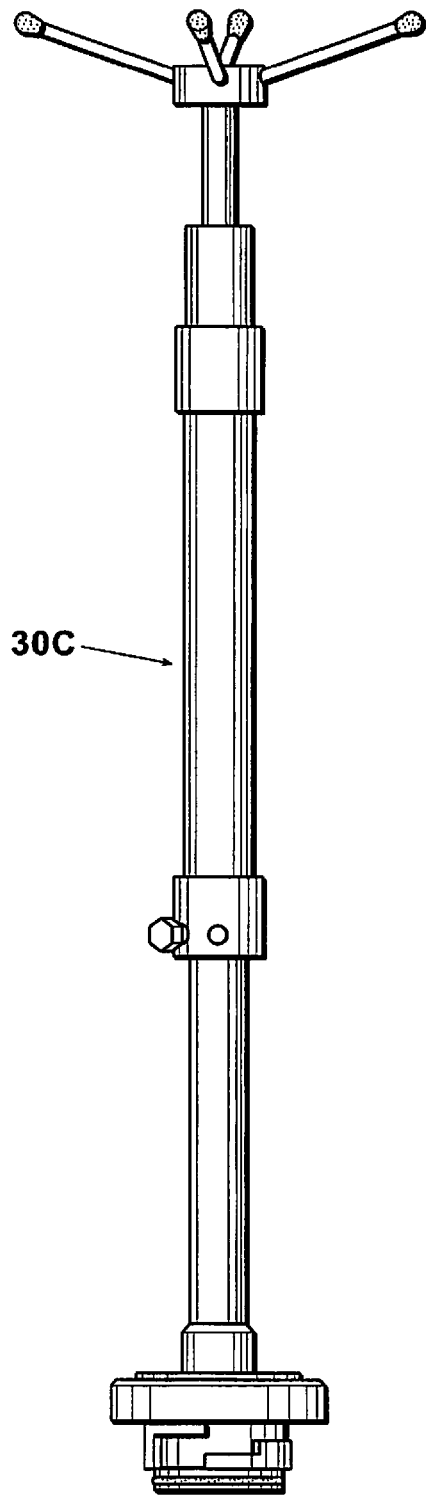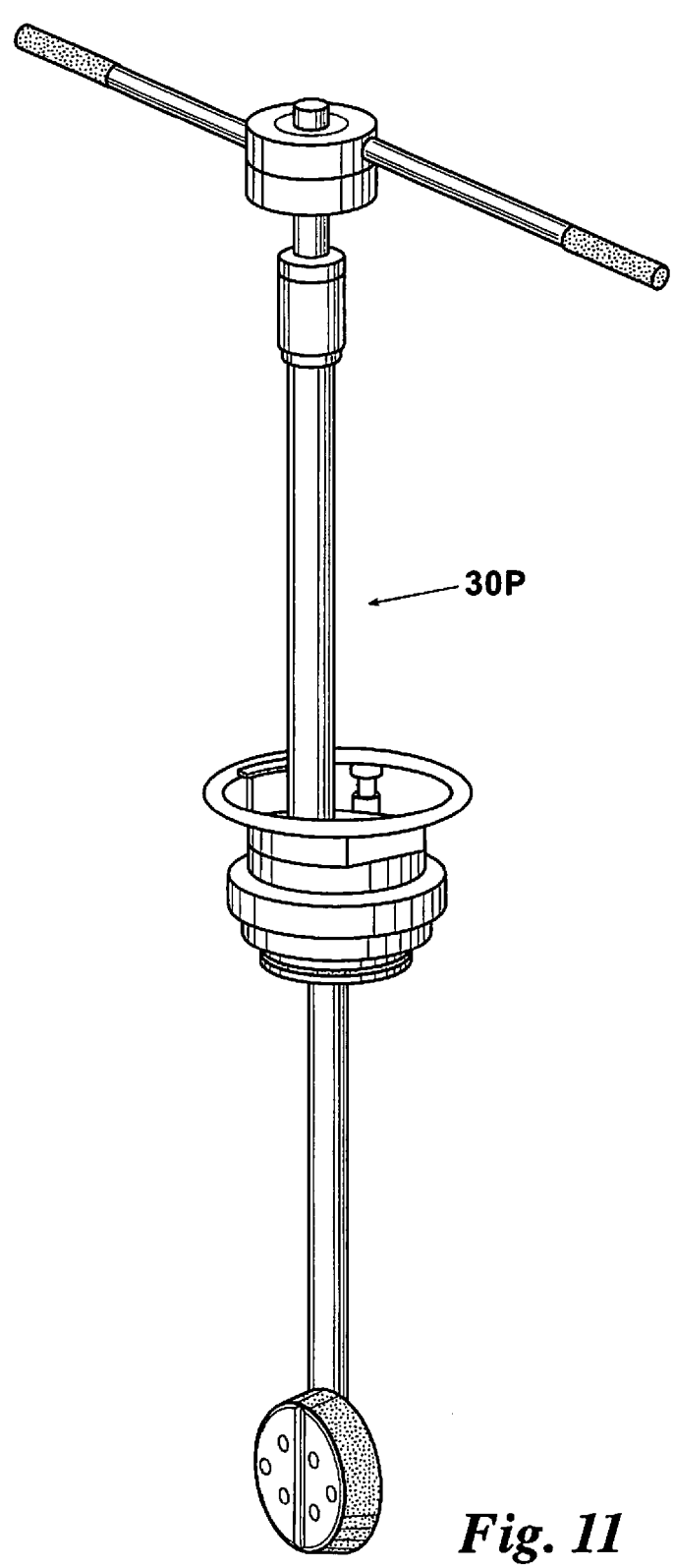
Fig. 10
Fig. 11

POLYETHYLENE PIPE SERVICE SYSTEM INCLUDING QUICK CONNECT MEANS FOR POLYETHYLENE PIPE TAPPING, PLUGGING, AND COMPLETION OPERATIONS

CROSS-REFERENCE TO CO-PENDING APPLICATIONS

This application is a continuation of U.S. application Ser. No. 17/240,465, filed Apr. 26, 2021, which is a continuation of U.S. application Ser. No. 16/812,985, filed Mar. 9, 2020 now U.S. Pat. No. 10,989,344, which in turn claims priority to US Provisional Application Nos. 62/815,207 filed Mar. 7, 2019, and U.S. 62/892,351 filed Aug. 27, 2019, all of which are incorporated herein by reference.

BACKGROUND

This disclosure is in the field of pipeline hot tapping, plugging, and completion services and, more particularly, systems, apparatuses, and methods used in performing hot tap, plugging, and completion operations on polyethylene pipe in-situ, including means for connecting a polyethylene ("PE") pipe service machine to a valve of the PE pipe that provides access to an interior volume of the pipe, the machine connecting to and passing through the valve when in an open position and providing means to tap into a wall of the PE pipe, means to plug product flow through the PE pipe, or means to plug a tapped opening in the wall.

SUMMARY

Embodiments of a polyethylene pipe service system of this disclosure include a valve having a lower end configured for removable connection to, and detachment from, a threaded portion of a polyethylene branch connection and an upper end including an external threaded or flanged portion and a first portion of a cam profile. The first portion of the cam profile may be a male portion and include a pair of tabs. The tabs may be located on an inside wall of the upper end of the valve. A polyethylene pipe service machine—such as a drilling machine including a cutting tool or a plugging machine including a plugging tool or a completion machine including a completion tool—includes a connector at a lower end comprising a second portion of the cam profile shaped complementary to the first portion of the cam profile of the upper end of the valve. The second portion of the cam profile may be a female portion and include a pair of stair-stepped channels sized to accommodate a respective tab of the first portion of the cam profile. The stair-stepped channels may be located on an outside wall of the lower end of the machine. In some embodiments, the first portion of the cam profile includes the stair-stepped channel and the second portion of the cam profile includes the pair of tabs.

Mating of the first and second portion of the cam profile and less than a full rotation or turn connects a respective machine to the valve, the machine rotating from its initial clock position to a final clock position. A collar, which may be threaded and having a diameter greater than the portion of the cam profile of the machine, is configured for connection to the external threaded or flanged portion of the upper end of the valve. The collar further secures the machine to the valve.

The cutting tool may include means to contain chips removed during cutting of a polyethylene pipe. The cutting tool and the plugging tool may each include a circular-shaped handle or operating wheel for ease of use. Additionally, the machines may include appropriate indicators or visual controls to guide operators when in use. For example, the valve may include a line or mark and the wheel may include a corresponding line or mark, alignment of the lines or marks with one another indicating the machine is in its proper clock position for insertion into the valve.

The valve may be configured for use with a first polyethylene pipe size and a second different polyethylene pipe size. The first and second polyethylene pipe sizes may be in a range of DN 90 to DN 250 (imperial sizes 4 inches to 8 inches). The valve may include a disk with lock-out means configured to prevent the disk from moving between a closed and an open position until pressure is equalized above and below the disk. The valve may also include a grounding strap.

BRIEF DESCRIPTION OF THE DRAWINGS

FIG. 8 is a bottom plan view of the machine of FIG. 7.

FIG. 9 is an isometric view of a valve of this disclosure when connected to a pipe and ready to connect to a polyethylene pipe service machine of this disclosure.

FIG. 10 is an isometric view of a completion or plug setting machine including a quick connect/disconnect of this disclosure.

FIG. 11 is an isometric view of plugging machine of FIG. 3 including a quick connect/disconnect of this disclosure.

Throughout the drawings, the same reference character is used for the same part, no single reference character being used for two different parts or for a given part and a modification of such part.

DEFINITIONS

Figure 1:
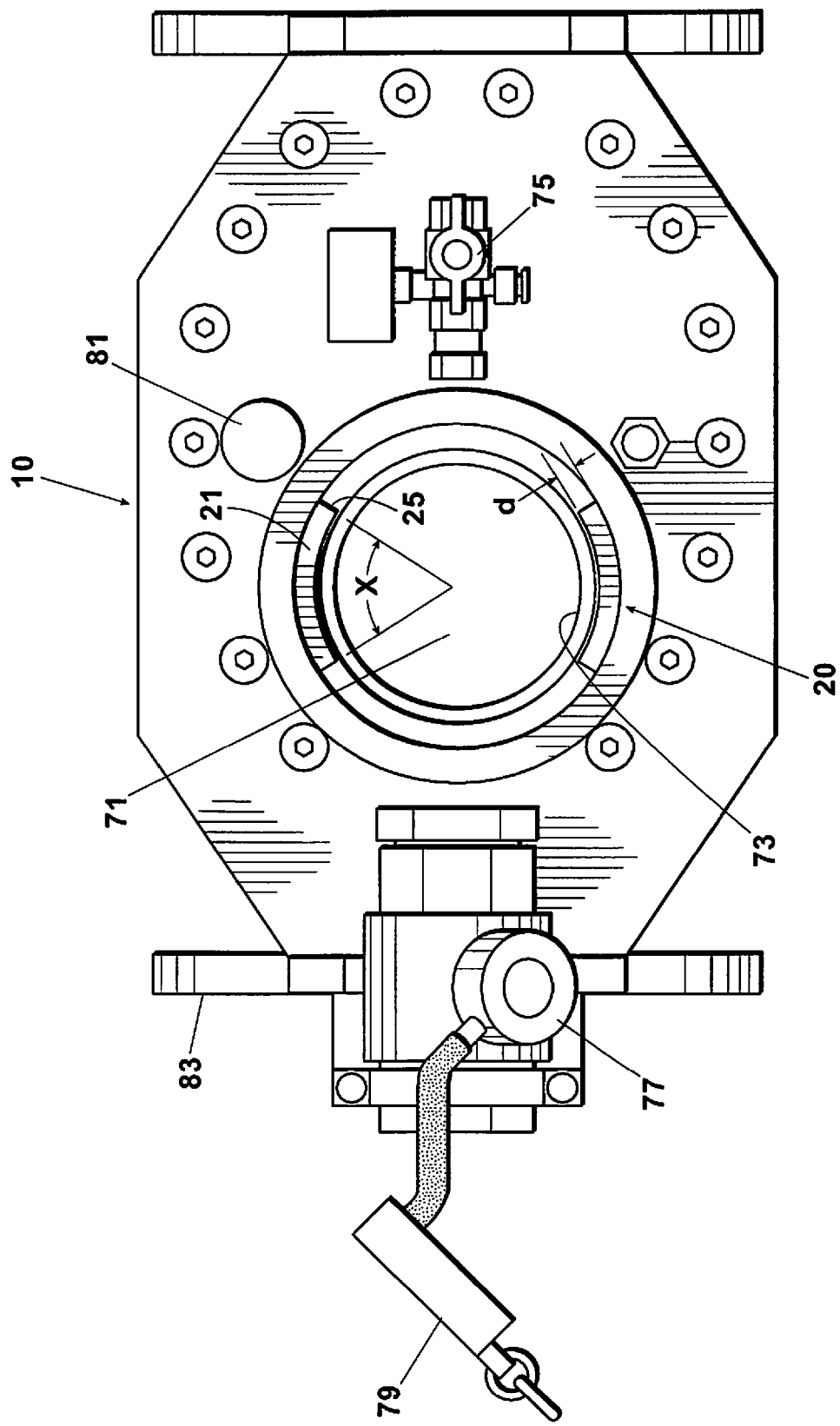
FIG. 1 is a top plan view of an embodiment of a valve of this disclosure configured for quick connect/disconnect to and from a machine of this disclosure. The quick connect/disconnect is by way of a cam profile, a portion of which is on the valve and another portion of which is on the machine.
Figure 2:
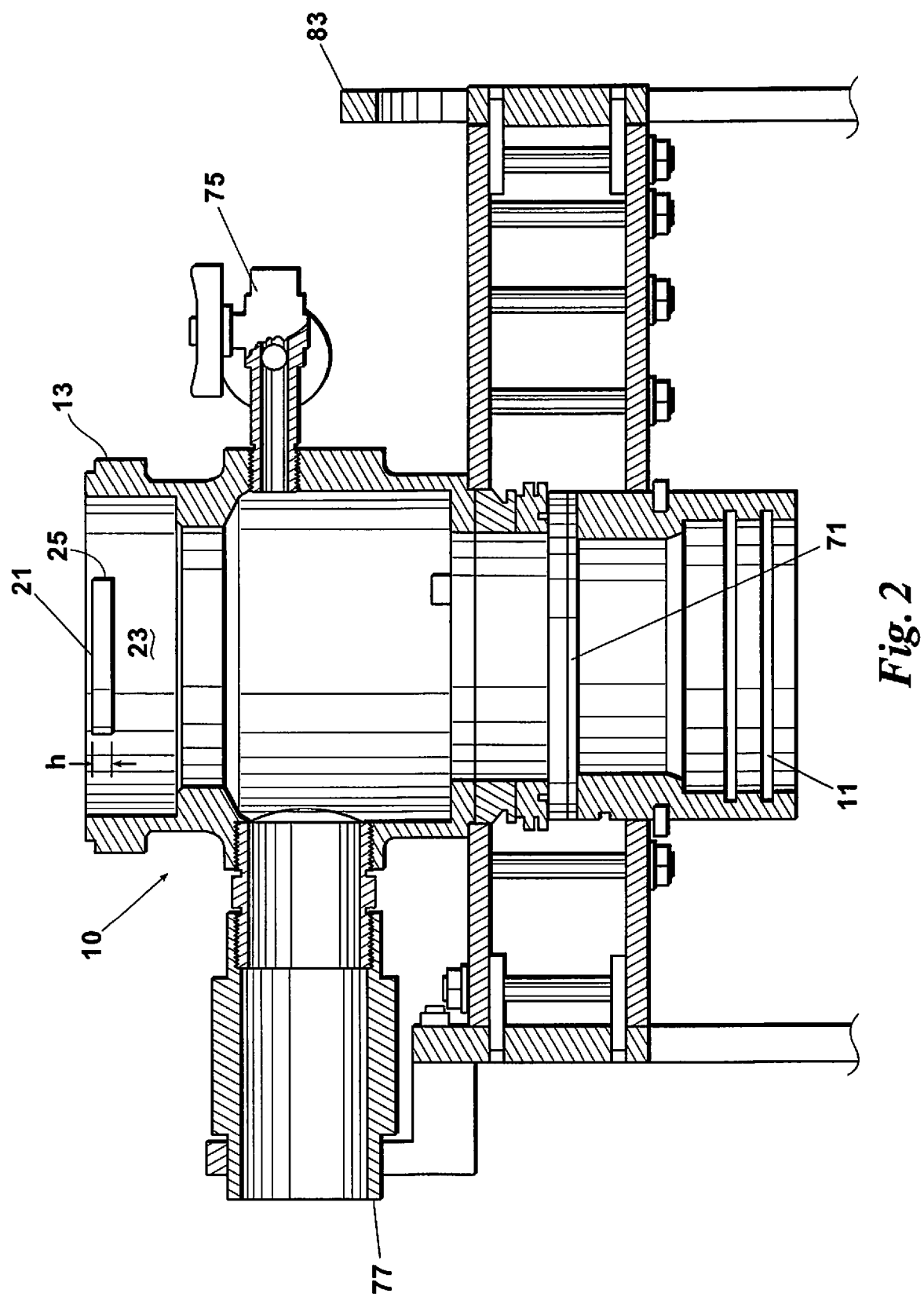
FIG. 2 is cross-section view of the valve of FIG. 1.
Figure 3:
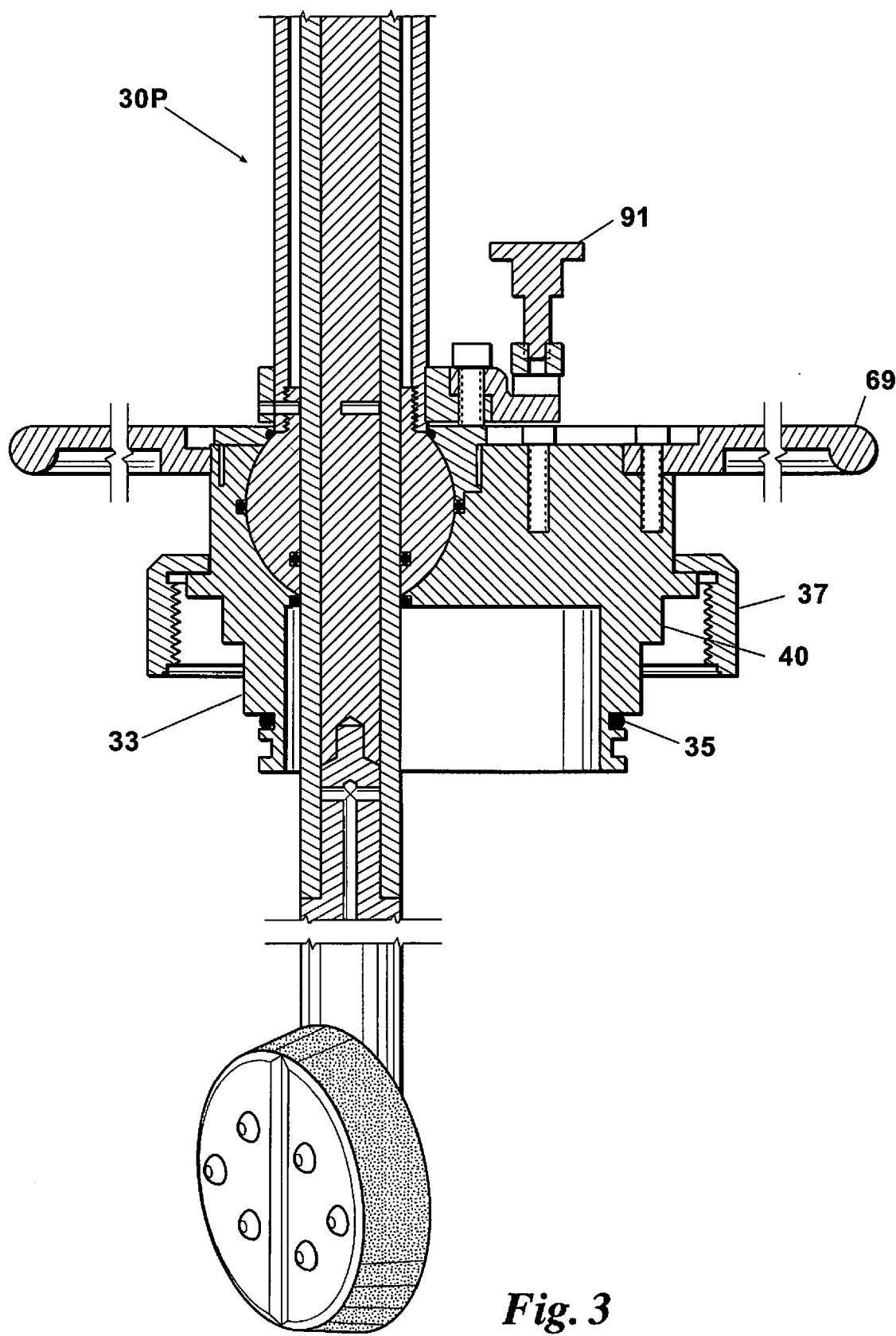
FIG. 3 is a cross-section view of an embodiment of a polyethylene pipe service machine configured for quick connect/disconnect to and from a valve of this disclosure. The machine shown here is configured for plugging. In other embodiments, the machine may be configured for drilling or hot tapping, or completion with their respective associated tools. Regardless of the polyethylene pipe service use being performed, the machine includes a portion of the cam profile for quick connect/disconnect to and from the valve.
Figure 4:
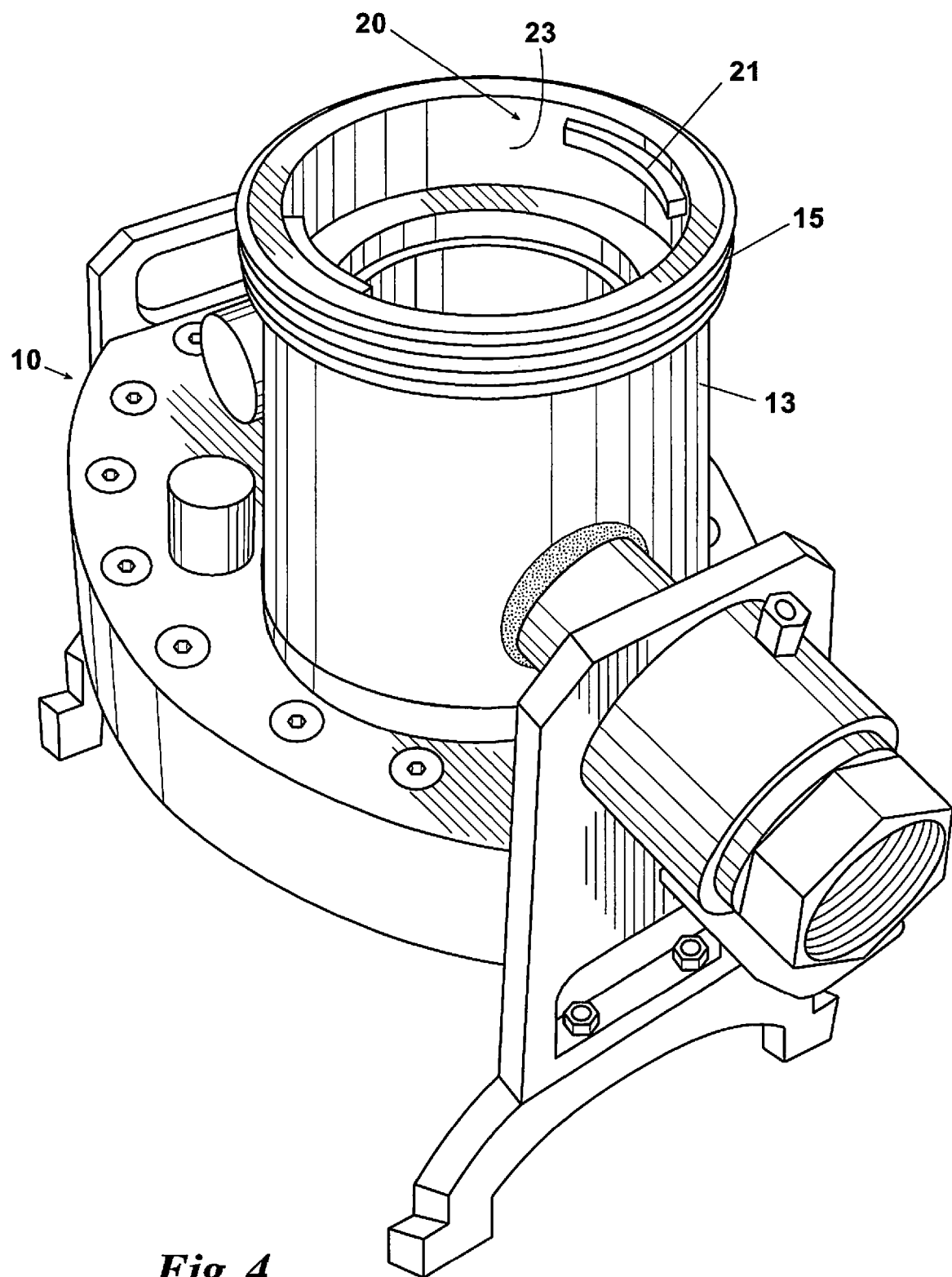
FIG. 4 is an isometric view of an embodiment of a valve of this disclosure, the valve having a first portion of a cam profile complementary to that of a machine configured for use with the valve and containing a second portion of the cam profile. In embodiments, the cam profile of the valve may include a pair of tabs. The valve can include handles that also help support the weight of the valve connected to a saddle branch fitting of the polyethylene pipe.
Figure 5:
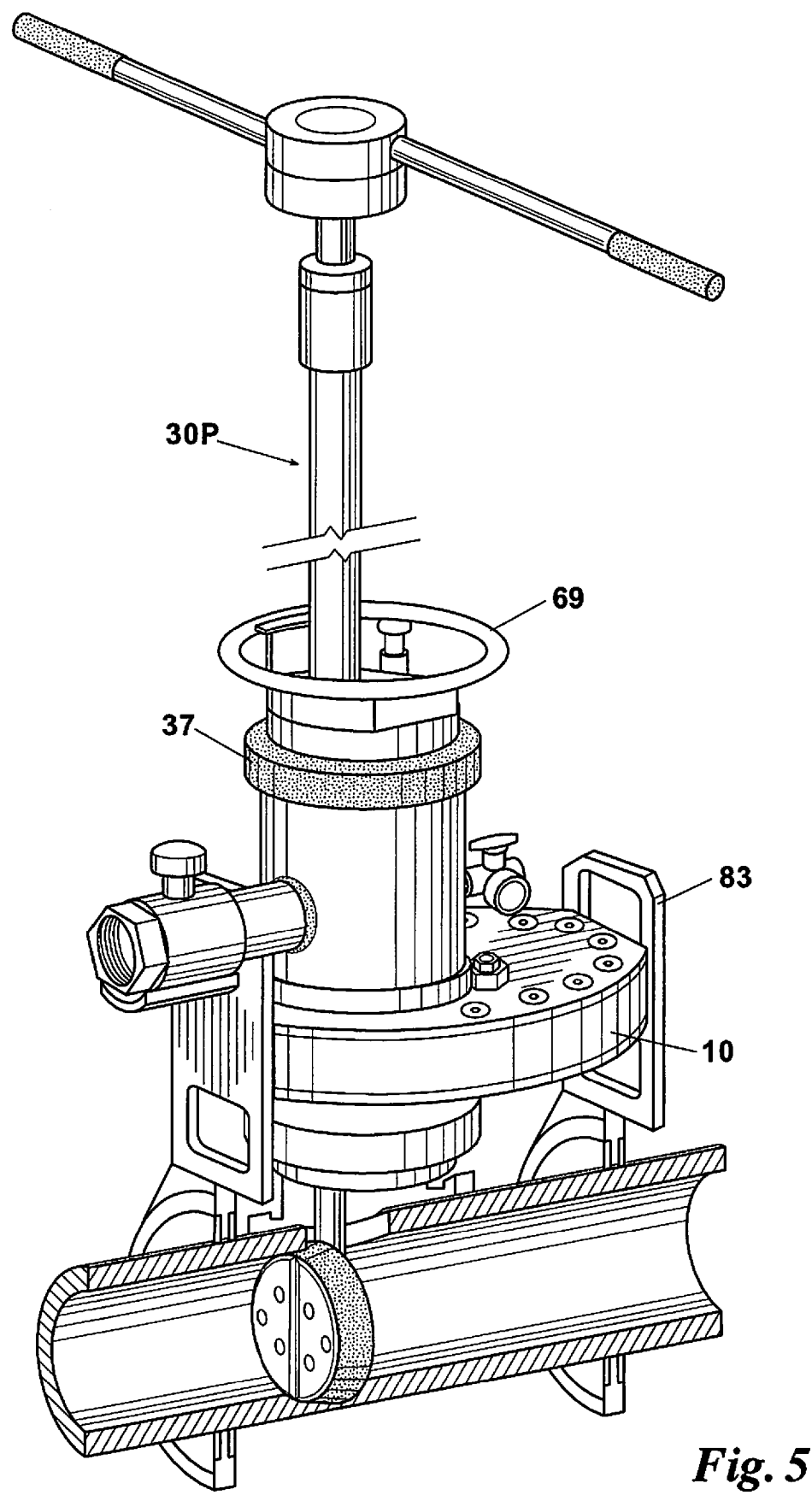
FIG. 5 is an isometric view of an embodiment of a plugging machine of this disclosure. The plugging machine includes a portion of the cam profile for mating with another portion located on the valve.
Figure 6:
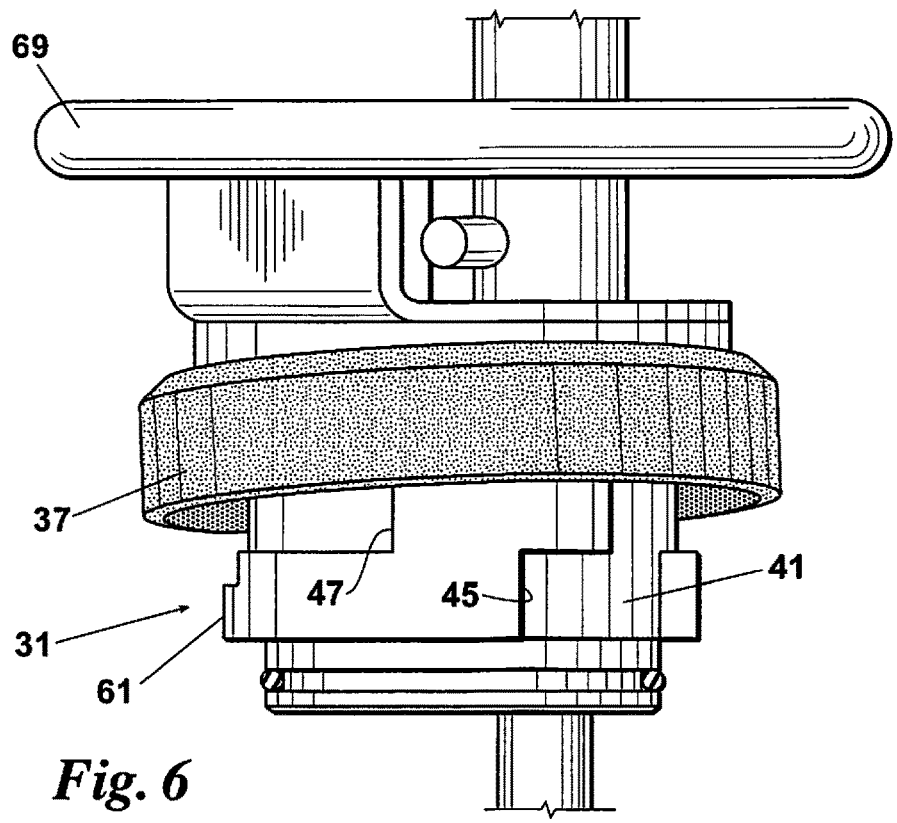
FIG. 6 is a partial front elevation view of an embodiment of a hot tapping machine configured for use with a valve of this disclosure and having an external cam profile of a polyethylene pipe service machine. The external cam profile is complementary to that of the valve. In embodiments, the cam profile of the machine may include a stair-stepped channel. In other embodiments, the valve may include the stair-stepped channel and the machine may include the tabs like those of FIG. 4. The same arrangement of parts and cam profile may be used on a plugging machine and a completion machine.
Figure 7:
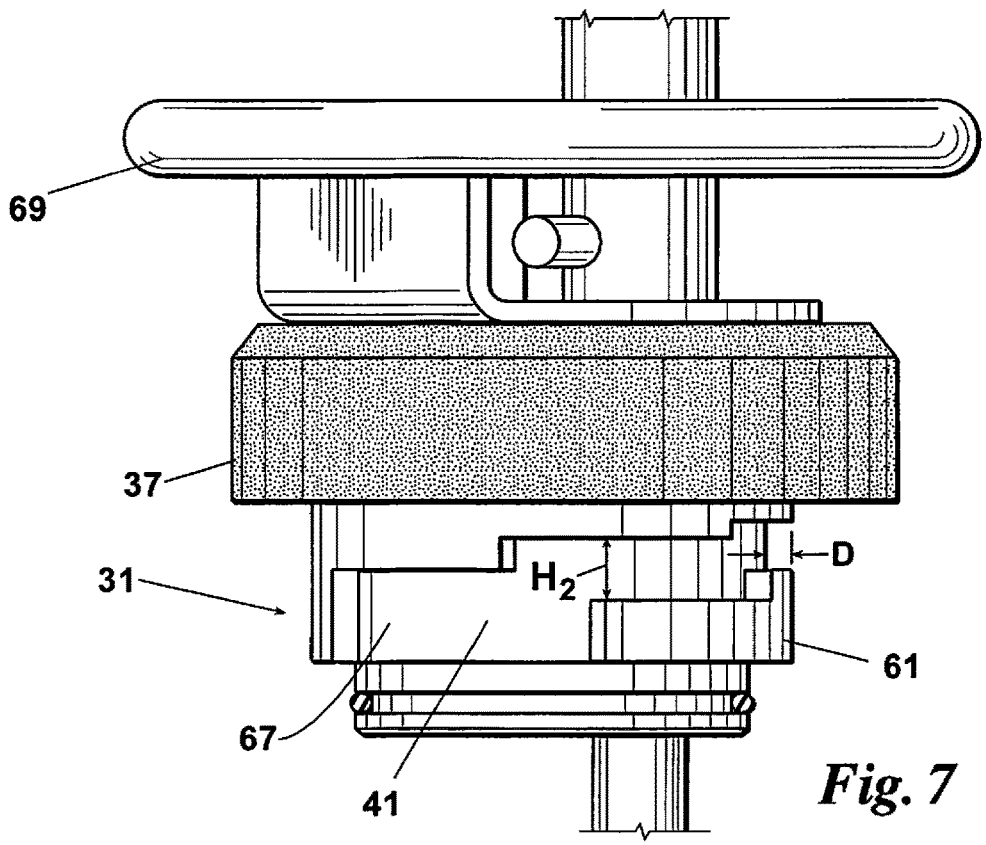
FIG. 7 is another front elevation view of the machine of FIG. 6.
Figure 12:
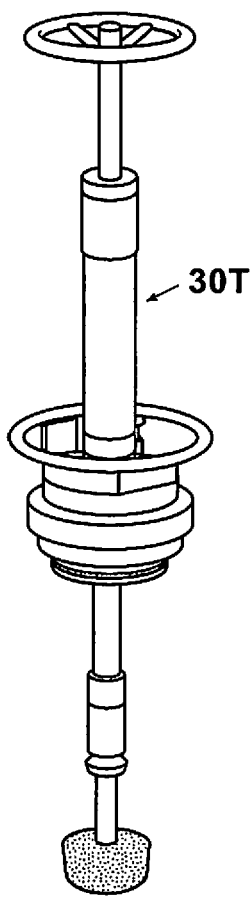
FIG. 12 is an isometric view of a hot tapping machine of this disclosure.
Figure 13:
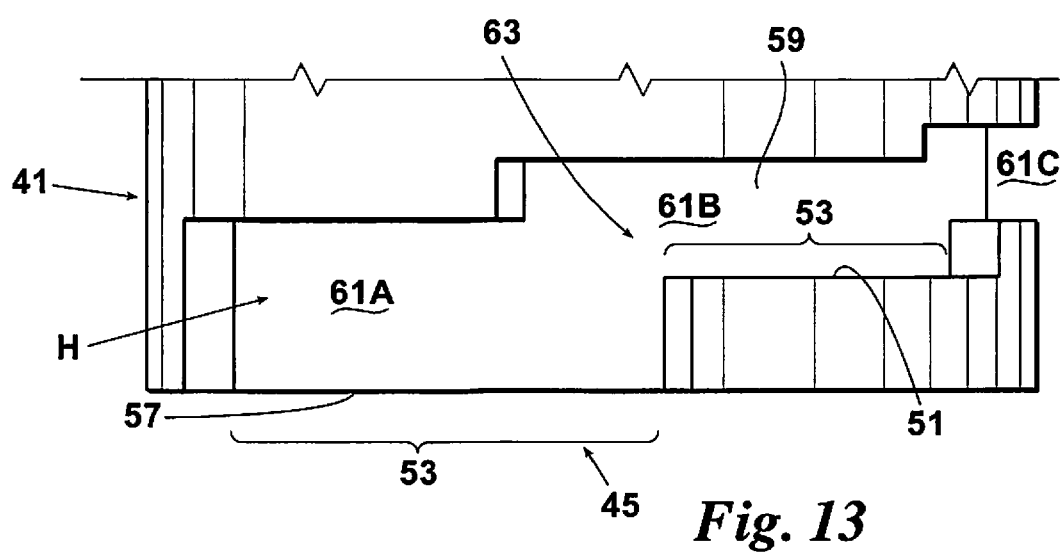
FIG. 13 is an enlarged view of an embodiment of a cam profile including a stair-stepped channel like that of FIGS. 6 & 7. The channel may be located at a lower end of the machine or at an upper end of the valve, with corresponding tabs located on the valve or machine, respectively.
Figure 14A:
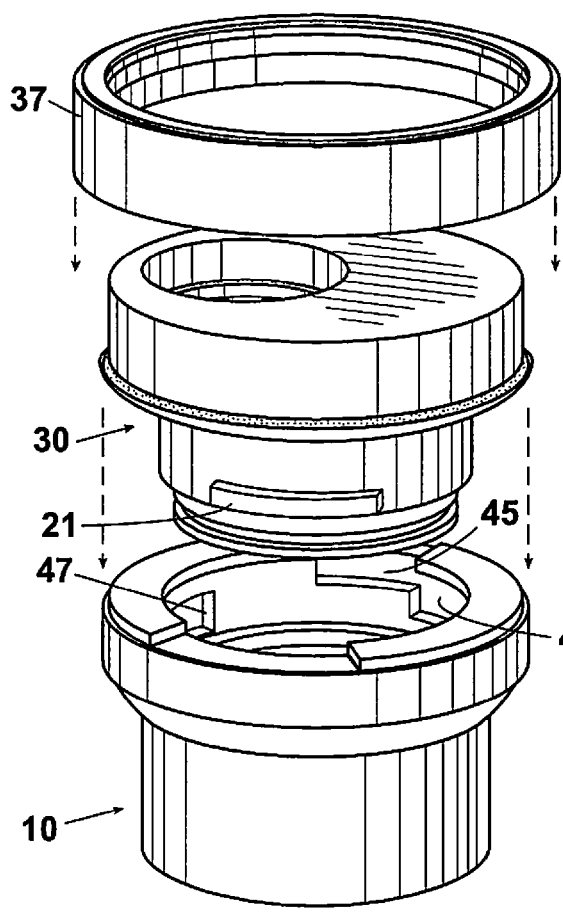
FIG. 14A is an illustration showing the relationship between the valve, machine, and collar. In embodiments, the portion of the cam profile of the valve may be like that of the machine of FIG. 6 and the portion of the cam profile of the machine may be like that of the valve of FIG. 4. The machine portion may include a pressurization opening in addition to a circular-shaped tool opening.
Figure 14B:
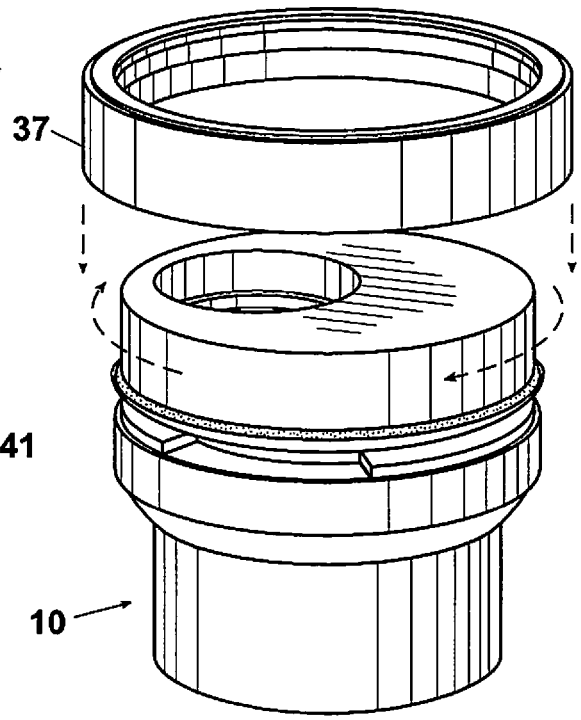
FIG. 14B illustrates the machine engaging the valve and being rotated relative to the valve.
Figure 14C:
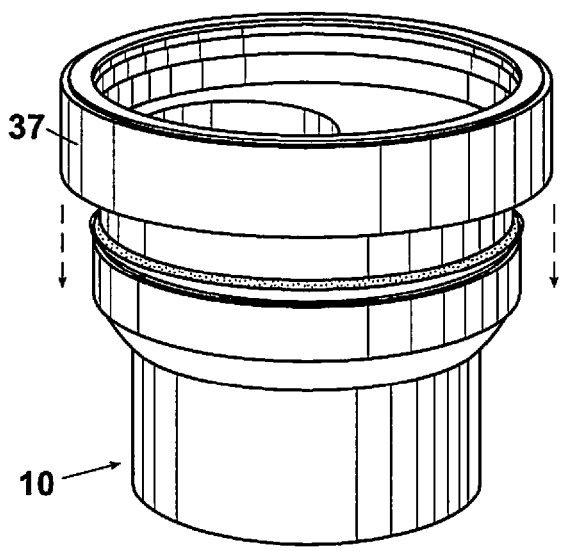
FIG. 14C illustrates the machine when at the end of its rotation relative to the valve and the threaded collar being positioned to further secure the machine to the valve.
Figure 14D:
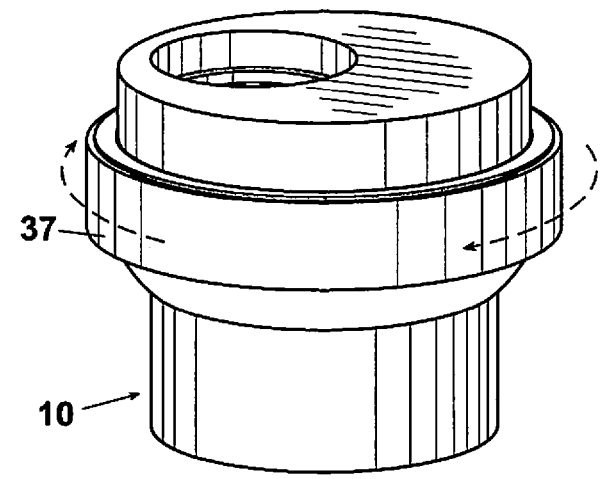
FIG. 14D illustrates rotation of the threaded collar.

For the purposes of this disclosure, the following definitions apply.

Machine means a device configured for use with a polyethylene ("PE") pipe servicing system of this disclosure and connectable to a valve of the PE pipe that provides access to an interior volume of the pipe for servicing, the device connecting to and passing through the valve when in an open position and providing means to tap into a wall of the PE pipe, means to plug product flow through the PE pipe, or means to plug a tapped opening in the wall.

Stair-stepped channel means a passageway located on an interior wall of the valve or an exterior wall of the machine and including at least two runs at different elevations, the runs being separated by a rise orthogonal to the runs.

Cam profile means a non-threaded body or follower (e.g. a tab) and a non-threaded passageway or channel having discrete changes in elevation (e.g. a stair-stepped channel) by which motion is communicated to the follower, with rotation of the passageway or channel into different clock positions relative to the follower places the follower at a different location and elevation within the passageway or channel. The follower and channel are shaped complementary to one another and one or the other may be located on the valve or on the machine. The follower may be a first portion of the cam profile and the channel may be the second portion (or vice versa).

Terms "including", "comprising", "consisting" and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. Where the claims or specification refer to "a" or "an" element, the "a" or "an" should not be construed meaning there is only one of that element. Where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, embodiments of the claimed invention are not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs. Methods of this disclosure may be implemented by performing or completing selected steps or tasks manually, automatically, or a combination thereof. Where reference is made to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

Terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Where an example is provided, the example is intended to be non-limiting. The example may not list elements well known in the art and not every element listed or described in the example is necessarily required in the embodiment of the example (except where context excludes that possibility) or in claimed embodiments.

DETAILED DESCRIPTION

Embodiments of a polyethylene pipe ("PE") servicing system of this disclosure are configured for use with a fusible polyethylene fitting "F" that provides a branch connection to a PE pipeline section or run "P" to be serviced in situ. The fitting F may be a saddle branch fitting. In embodiments of a system and method of this disclosure, no squeezing is used to service the pipeline run P. The system comprises a valve 10 including a first portion 20 of a cam profile and a machine 30 including a complementary second portion 40 of the cam profile. The first portion 20 of the cam profile may be a male portion and include a pair of tabs 21. The second portion 40 of the cam profile may include a pair of stair-stepped channels 41 each sized to receive a corresponding one of the tabs 21. Engaging the first and second portions 20, 40 of the cam profile with one another places the machine 30 in its correct angular or clock position relative to the valve 10. After initial engagement, turning the machine 30 relative to the valve 10 connects the machine 30 to the valve 10 and places the machine in its correct clock position for use. In embodiments, the first and second portions 20, 40 of the cam profile extend less than 180° of the circumference. Full engagement of the portions 20, 40 occurs in less than a full turn of the machine 30. A threaded collar 37 may then be used to further secure the machine 30 to the valve 10. The machine 30 may include a locking bar 91, further securing it to the valve 10 in its correct operating position.

In embodiments, the valve 10 includes a threaded lower end 11 configured for connection to a corresponding threaded portion "T" of the fitting F; and an upper end 13 having an external threaded portion 15 and the first portion 20 of the cam profile. At least one machine 30 configured for use in a PE service system includes a connector 31 at its lower end 33 comprising the second portion 40 of the cam profile shaped complementary to the first portion 20 of the cam profile at the upper end 13 of the valve 10. An O-ring 35 may be located below the first portion 40 of the cam profile. A threaded collar 37, having a diameter greater than the second portion 40 of cam profile and configured for connection to the external threaded portion 15 of the upper end 13 of the valve 10, may be used to temporarily secure the connection of the machine 30 to the valve 10.

In embodiments, the first portion 20 of the cam profile includes a pair of tabs 21 located at the cylindrical upper end 13 of the valve 10. The tabs 21 mate to a second portion 40 of the cam profile that includes pair of stair-stepped channels 41 at a cylindrical lower end 33 of a machine 30T, 30P, 30C configured for tapping, plugging, and completion, respectively, of a kind associated with hot tapping, plugging, and completion operations. The tabs 21, which have a total depth "d" and a total height "h", are located opposite one another on an inner wall 23 of the upper end 13 and extend less than a full circumference of the cylindrical upper end 13 of the valve 10. Similarly, the stair-stepped channels 41, which have a total depth "D" and a total channel height "H", are located opposite one another on an external wall 67 of the lower end 33 and extend less than a full circumference of the cylindrical lower end 33. The depth D and the height H of the channel 41 are each sized to accommodate, respectively, the depth d and height h of the tab 21 as the tab 21 travels an entire distance of the stair-stepped channel 41. As the machine 30 rotates relative to the valve 10, the tabs 21 move "up" and along the channel 41 and the lower end 33 of the machine 30 (and therefore the machine 30) moves farther down into the valve 10.

In embodiments, D is about the same depth as d or equal to d and, in no cases, is less than d. The channel height H may differ over the length of the stair-stepped channel 41. For example, in some embodiments, H is greater at a first end 45 of the channel 41 (e.g. H1) than at a second end 47 (e.g. H3), or an intermediate run 50 in between the two ends 45, 47 (e.g. H2). In embodiments, the channel height H may be in a range of 1 h to 3 h. For example, H1 may be greater than h; H3 may be about equal to h (accounting for the clearance needed for tab 21 to travel the channel 41).

The stair-stepped channel 41 includes a first (open) end 45 at its lowermost elevation sized to receive the tab 21 and a second (closed) end 47 at its highest most elevation arranged to prevent further rotation of the machine 30T, 30P, 30C relative to the valve 10. The first end 45 of the channel 41 is positioned relative to the second end 47 so that when the tab 11 enters the first end 45, the machine 30T, 30P, or 30C is located at the correct beginning clock position and, after the machine 30T, 30P, or 30C is rotated relative to the valve 10, an end 25 of tab 21 contacts the second end 47 and further rotation relative to the valve 10 is prevented, locating the machine 30T, 30P or 30C at its correct ending clock position for use. For purposes of handing the machine 30T, 30P, or 30C and locating it on, and securing it to, the valve the machine 30 may include a circular-shaped handle or operating wheel 69. The wheel 69, as well as the valve 10, may each include a line or mark as a visual control. When the lines or marks are aligned with each other, the machine 30 is in its correct clock position for lowering or insertion into the valve 10.

In embodiments, the amount of rotation between the beginning and ending clock positions may be in a range of 90° (a quarter-turn) to 180° (half a turn), there being individual angles and sub-ranges within this broader range. The tab 21 extends X degrees of arc, where 15°<X<90°, the stair-stepped channel extending in a range of 2X to 4X degrees of arc, there being integer and non-integer values and subranges within this broader range, where 2X<180° and 4X<180°. By way of a non-limiting example, the tab 21 may extend 55° of arc with the stair-stepped channel 41 extending 165° of arc. Or, by way of another non-limiting example, the tab 21 may extend 30° of arc and the stair-stepped channel 41 may extend 90° of arc. In some embodiments, the amount of rotation is in a range of 60° to 90°. The amount of rotation permit the tabs 21 to the steps 61 of the stair-stepped channel 41. In some embodiments, the rotation permits travel along three stairs 61.

The stair-stepped channel 41 is defined by upper and lower walls, 49, 51 that define corresponding runs 53 and rises 55 of the channel 41 between the ends 45, 47. The upper and lower walls 49, 51 may run parallel to one another over the length of a run 53, with the rises 55 perpendicular to the run 53. The walls 49, 51 may be arranged to provide an upward sloping run 53 from the first end 45 to the second end 47. The first end 45 of each stepped channel 41 includes an opening 57 sized to receive a corresponding tab 21 of the valve 10 and having a height H greater than that of the tab 21. The opposing run portion 53 of the upper wall 49 functions as a stop and positions the tab 21 to enter downstream portion 59 of the channel 41, the amount of downward travel of the machine 30T, 30P, 30C relative to the valve 10 being the difference between the height h of the tab 21 and the height H of the channel 41 at the run 53. As the machine 30T, 30P, 30C is rotated relative to the valve 10, the tab 21 enters subsequent runs 53 of the channel 41 as rotation brings the second end 47 of the channel 41 closer to the tab 21. An end 25 of tab 21 contacts the second (closed)

end 47 and further rotation of the machine 30T, 30P, 30C relative to the valve 10 is prevented, locating the machine 30T, 30P or 30C at its correct clock position for use.

In embodiments, the stepped channel 41 may include three "steps", a first step 61A at the first end 45, a third step 61C located toward the second end 47, and a second step 61B located in between, each step 61 including a respective run 53 sized for the length of the tab 21. The first step 61A includes the open end 57 at its upstream end and an opening 63 at its downstream end, the opening 63 being the upstream end of the second step 61B. Similarly, the second step 61B includes another opening 63 at its downstream end, the opening being the upstream end of the third step 61C. The downstream end of the third step 61C is the second (closed) end 47 of the channel 41.

In embodiments of a method of use, the method incudes installing the valve 10 on the fitting F, locating the machine 30 onto the valve 10 in a vertical orientation so the portions 20, 40 of the cam profile mate to one another, turning a wheel 69n a clockwise direction so that the portions 20, 40 of the cam profile continue their further engagement and the machine 30 continues its travel vertically downward, and, once the machine 30 has travelled the full distance of the cam profile, securing the ring 37 to the valve 10. Additional equipment or tooling may then be installed on the machine 30. In embodiments, wheel 69 may be used by an operator to lift the machine 30 vertically and locate the machine 30 on the valve 10. The full distance of the cam profile may include three steps 61. The machine 30 may rotate 90° over the full distance. The valve 10 may be configured for use with a first pipe size and a second different pipe size, wherein the first and second pipe sizes are in a range of DN 90 to DN 250 (imperial sizes 4 inch to 8 inch). In some embodiments, the valve may weigh no more than about 50 lbs. for pipe sizes equal to or below DN 250.

In embodiments, the valve 10 includes a locking system to avoid the opening of the valve 10 before pressure equalization. The valve 10 may further include a disk 71 with lock-out means, the lock-out means configured to prevent the disk 71 from moving or translating axially between a closed and an open position relative to the central bore or valve opening 73 until pressure is equalized (balanced) above and below the disk 71. In embodiments, the valve 10 may include a purge valve 75, a bypass valve 77 (with an associated bypass tool 79), and pressure equalizing button 81. In embodiments, after machine 30T taps into the pipe P and its cutter is retracted to clear a top of the pipe, product fluid fills the valve housing as the disk 71 is being closed. The purge valve 75 then purges the product fluid above the closed disk 71. After the plugging machine 30P is secured to the valve 10, the pressure equalizing button 81 is pushed, thereby opening a channel that allows fluid below the closed disk 71 to enter the valve housing above the disk 71. This fluid on both sides of the disk 71 equalizes the pressure and the valve 10 may now be easily and safely opened. A same procedure may be used when attaching the completion machine 30C to the valve 10.

The disk 71 may be operated by means of a handle between an open and a closed position across the valve opening 73 by means configured to translate rotational motion into a transverse motion of the disk across the valve opening 73. The valve 10 may also include handles 83 having an arcuate lower end configured to rest on the pipe P. The valve 10 may also include a grounding strap of a kind known in the art (not shown).

The machine 30 may be a drilling or hot tapping machine 30T, a plugging machine 30P, or a completion machine 30C.

In embodiments, a 4-inch to 8-inch plugging machine may weigh no more than about 34 lbs. and a 10-inch plugging machine may weigh no more than about 60 lbs. The machine 30 may include, where appropriate, a cutter, a plugger, a completion plug, or some combination thereof. The cutter may include means to contain chips removed during cutting of a polyethylene pipe. Other tools insertable through the valve 10 may also be used to perform other operations. By way of a non-limiting example, the tool may include means configured to insert and secure a completion plug The PE servicing system of this disclosure may be used in applications with line pressures up to 150 psi for pipe in a range of DN 90 to DN 250. The system and method provides faster application than prior art systems and methods with full scope of operation, including cleaning, fusion, cool down, hot tapping, plugging and completion. Total application time may be in a range of 1 hour to 2 hours, 1⅛ hours to 1⅞ hours, 1¼ hour to 1¾ hours, 1⅜ hours to 1⅝ hours.

EXAMPLES

1. A polyethylene pipe service system comprising:
   a valve 10 including
      a lower end 11 configured for connection to a threaded portion of a polyethylene branch connection fitting F; and
      an upper end 13 including an external threaded or flanged portion 15 and a first portion 20 of a cam profile, the first portion 20 of the cam profile may include a pair of tabs 21; and
   a machine 30 connectable to the valve 10, the machine including:
      at least one tool configured for polyethylene pipeline cutting, plugging, or completion;
      a connector 31 comprising a second portion 40 of the cam profile complementary to the first portion 20 of the cam profile of the upper end 13 of the valve 10, the second portion 40 of the cam profile may include a pair of stair-stepped channels 41, each sized to receive a respective tab of the pair of tabs 21;
      and
      a collar 37 having a diameter greater than the second portion 40 of the cam profile and configured for connection to the external threaded or flanged portion 15 of the upper end 13 of the valve 10;
   wherein mating of said first and second portions 20, 40 of the cam profile connects the machine 30 to the valve 10 in a proper position for use of the machine 30.
2. The polyethylene pipe service system of example 1, the valve 10 configured for use with a first polyethylene pipe size and a second different polyethylene pipe size.
3. The polyethylene pipe service system of any of the preceding examples 1-2, wherein the first and second polyethylene pipe sizes are in a range of DN 90 to DN 250.
4. The polyethylene pipe service system of any of the preceding examples 1-3, the valve 10 including a disk 71 with lock-out means configured to prevent the disk 71 from moving between a closed and an open position until pressure is equalized above and below the disk 71.
5. The polyethylene pipe service system of any of the preceding examples 1-4, the valve including a grounding strap.

6. The polyethylene pipe service system of any of the preceding examples 1-4, the at least one tool including means to contain chips removed during cutting of a polyethylene pipe.
7. The polyethylene pipe service system of any of the preceding examples 1-6, the machine 30 including a circular-shaped handle 69 for rotation of the machine 30 relative to the valve 10.
8. The polyethylene pipe service system of any of the preceding examples 1-7, the machine including an O-ring 35 located below the second portion 40 of the cam profile.
9. A polyethylene pipe service system and method of use comprising:
   a valve 10 including
      a lower end 11 configured for connection to a threaded portion T of a polyethylene branch connection; and
      an upper end 13 including an external threaded or flanged portion 15 and a first portion 20 of a cam profile, the first portion 20 of the cam profile may include a pair of tabs 21;
   a drilling machine 30T including a cutting tool;
   a plugging machine 30P including a plugging tool;
   a completion machine 30C including a completion tool;
   the drilling, plugging, and completion machines 30T, 30P, 30C each including;
      a connector 31 comprising a second portion 40 of the cam profile complementary to the first portion 20 of the cam profile of the upper end 13 of the valve 10, the second portion 40 of the cam profile may include a pair of stair-stepped channels 41, each sized to receive a respective tab of the pair of tabs 21;
      and
      a collar 37 having a diameter greater than the second portion 40 of the cam profile and configured for connection to the external threaded or flanged portion 15 of the upper end 13 of the valve 10;
   wherein mating of said first and second portions 20, 40 of the cam profile connects a respective machine 30T, 30P, 30C to the valve 10.
10. The polyethylene pipe service system of example 9, the valve 10 configured for use with a first polyethylene pipe size and a second different polyethylene pipe size.
11. The polyethylene pipe service system of any of the preceding examples 9-10, wherein the first and second different polyethylene pipe sizes are in a range of DN 90 to DN 250.
12. The polyethylene pipe service system of any of the preceding examples 9-11, the valve 10 including a disk 71 with lock-out means configured to prevent the disk 71 from moving between a closed and an open position until pressure is equalized above and below the disk 71.
13. The polyethylene pipe service system of any of the preceding examples 9-12, the valve including a grounding strap.
14. The polyethylene pipe service system of any of the preceding examples 9-13, the cutting tool including means to contain chips removed during cutting of a polyethylene pipe.
15. The polyethylene pipe service system of any of the preceding examples 9-14, the completion tool including a completion plug.
16. The polyethylene pipe service system of any of the preceding examples 9-15, the lower end 33 of at least one of the drilling machine 30T, plugging machine 30P, and completion machine 30C includes a circular-shaped handle 69.
17. The polyethylene pipe service system of any of the preceding examples 9-16, the collar 37 including a threaded portion.
18. The polyethylene pipe service system of any of the preceding examples 9-17, the machine 30T, 30P, 30C including an O-ring 35 located below the second portion 40 of the cam profile.
19. The polyethylene pipe service system of any of the preceding examples 1-18, wherein the cam profiles of the valve 10 and machine 30 are reversed, the valve 10 including the second portion 40 of the cam profile and the machine 30 including the first portion of the cam profile.
20. A method for securing a polyethylene pipe service machine 30 to a valve 10 connected to a saddle branch fitting F of a polyethylene pipe run P, the method including: securing the valve 10 according to any of the preceding examples 1-19 to the saddle branch fitting F; positioning the polyethylene pipe service machine 30 according to any of the preceding examples 1-19 above and directly over the valve 10; aligning the first and second portions 20, 40 of the cam profile to one another; lowering the polyethylene pipe service machine 30 into the valve 10 until its downward travel is arrested by the first portion 20 or 40 of the cam profile; rotating the polyethylene pipe service machine 30 relative to the valve 10 until the rotation is arrested by the first portion 20 or 40 of the cam profile; and securing the collar 37 to the cylindrical-shaped upper end 13 of the valve 10.

Embodiments of this disclosure are well adapted to carry out the objects and attain the ends and advantages mentioned above as well as those inherent therein. While the embodiments have been described and illustrated herein by reference to certain preferred embodiments in relation to the drawings, various changes and further modifications, apart from those shown or suggested herein, may be made by those of ordinary skill in the art, without departing from the spirit of the inventive concept, the scope of which is determined by the following claims. The elements recited in the claims include the full range of equivalents to which each element is entitled.

The invention claimed is:
1. A pipe service system comprising:
   a valve (10) adapted for use with an access fitting of a pipe; and
   a pipe service machine (30T, 30P, or 30C) adapted for use with the valve;
   the pipe service system further comprising:
      a channel (40) having at least one change in elevation and being non-threaded, and
      a follower (20) adapted for engagement with the channel;
   the channel located on only one of the valve or the pipe service machine;
   the follower located on only another one of the valve or the pipe service machine.
2. The pipe service system of claim 1, wherein when the follower engages the channel, rotation of the pipe service machine secures the pipe service machine to the valve.
3. The pipe service system of claim 2, wherein the rotation is less than 360°.

4. The pipe service system of claim 2, wherein the rotation changes an elevation of the pipe service machine relative to the valve.

5. The pipe service system of claim 1, wherein the channel is a stair-stepped channel.

6. The pipe service system of claim 5, wherein the channel includes at least one rise and two runs.

7. The pipe service system of claim 1, wherein the follower is tab-shaped.

8. The pipe service system of claim 1, wherein the follower is non-threaded.

9. The pipe service system of claim 1, wherein the valve and the pipe service machine are adapted for use with polyethylene pipe.

10. A pipe service system comprising:
- a valve (10) including a first portion (20 or 40) of a cam profile;
- a pipe service machine (30T, 30P, or 30C) adapted for use with the valve and including a second portion (40 or 20) of the cam profile;
- the first and second portions of the cam profile adapted to engage with one another, wherein, the cam profile is non-threaded, and wherein, when the first and second portions engage one another, rotation of the pipe service machine relative to the valve changes an elevation of the pipe service machine relative to the valve.

11. The pipe service system of claim 10,
wherein the first portion of the cam profile is located on only one of the valve or the pipe service machine and the second portion of the cam profile is located on only another one of the valve or the pipe service machine, the first and second portions being different than one another and selected from the group consisting of a channel having at least one change in elevation and a follower adapted for engagement with the channel.

12. The pipe service system of claim 11, wherein the change in elevation is a discrete change in elevation.

13. The pipe service system of claim 11, wherein the channel is a stair-stepped channel.

14. The pipe service system of claim 13, wherein the channel includes at least one rise and two runs.

15. The pipe service system of claim 11, wherein the follower is tab-shaped.

16. The pipe service system of claim 10, wherein the valve and the pipe service machine are adapted for use with polyethylene pipe.

17. A method for temporarily connecting a pipe service machine to a valve, the method comprising:
- when the valve is connected to an access fitting of the pipe, engaging a first portion of a cam profile located on the pipe service machine with a second portion of the cam profile located on the valve, the cam profile being non-threaded; and
- after the engaging, connecting the pipe service machine to the valve by rotating the pipe service machine relative to the valve.

18. The method of claim 17, wherein the rotating is less than 360°.

19. The method of claim 17,
wherein the first portion of the cam profile is located on only one of the valve or the pipe service machine and the second portion of the cam profile is located on only another one of the valve or the pipe service machine, the first and second portions being different than one another selected from the group consisting of a channel having at least one change in elevation and a follower adapted for engagement with the channel.

20. A pipe service system comprising:
a valve adapted for use with an access fitting of a pipe; and
a pipe service machine adapted for use with the valve;
the pipe service system further comprising:
- a stair-stepped channel having at least one rise and two runs; and
- a follower adapted for engagement with the stair-stepped channel;

the stair-stepped channel located on only one of the valve or the pipe service machine and the follower located on only another one of the valve or the pipe service machine.

* * * * *